(12) United States Patent
Soyama et al.

(10) Patent No.: US 7,616,373 B2
(45) Date of Patent: Nov. 10, 2009

(54) DISPLAY DEVICE PARTICLES, PROCESS FOR PRODUCING THE SAME, IMAGE-DISPLAY MEDIUM, AND IMAGE-FORMING DEVICE

(75) Inventors: Hidehiko Soyama, Minamiashigara (JP); Satoshi Hiraoka, Minamiashigara (JP); Yasuo Yamamoto, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 916 days.

(21) Appl. No.: 10/863,390

(22) Filed: Jun. 9, 2004

(65) Prior Publication Data
US 2005/0074680 A1 Apr. 7, 2005

(30) Foreign Application Priority Data
Oct. 1, 2003 (JP) ............................. 2003-343408

(51) Int. Cl.
*G02B 26/00* (2006.01)
*G09G 3/34* (2006.01)
(52) U.S. Cl. ...................................... 359/296; 345/107

(58) Field of Classification Search ................. 359/296, 359/290, 238–241, 248; 345/105, 107; 204/600, 204/605
See application file for complete search history.

(56) References Cited

U.S. PATENT DOCUMENTS

| 6,262,706 | B1 * | 7/2001 | Albert et al. | 345/107 |
| 6,750,844 | B2 * | 6/2004 | Nakanishi | 345/107 |
| 7,161,732 | B2 * | 1/2007 | Kanbe | 359/296 |
| 7,224,511 | B2 * | 5/2007 | Takagi | 359/296 |

FOREIGN PATENT DOCUMENTS

| JP | A 2001-312225 | 11/2001 |
| JP | A 2002-010771 | 1/2002 |

OTHER PUBLICATIONS

Gurgrae-Jo et al. "New Toner Display Device (I): Image Display Using Conductive Toner and Charge Transport Layer." *Japan Hardcopy 1999* pp. 249-252.

* cited by examiner

*Primary Examiner*—Mohammed Hasan
(74) *Attorney, Agent, or Firm*—Oliff & Berridge, PLC

(57) ABSTRACT

The present invention provides display device particles that have positive or negative chargeability and have color and are produced using at least a calcium compound, in which a concentration of the calcium compound in the display device particle is 0.05% by weight or less in terms of a calcium element content, a process for producing the display device particles, as well as an image-display medium and an image-forming device each using the display device particles.

15 Claims, 1 Drawing Sheet

DISPLAY DEVICE PARTICLES, PROCESS FOR PRODUCING THE SAME, IMAGE-DISPLAY MEDIUM, AND IMAGE-FORMING DEVICE

CROSS-REFERENCE TO RELATED APPLICATION

This application claims priority under 35 USC 119 from Japanese Patent Application No. 2003-343408, the disclosure of which is incorporated by reference herein.

BACKGROUND OF THE INVENTION

1. Field of the Invention

The present invention relates to display device particles that are used for a display device, a process for producing the display device particles, as well as a repeatedly rewritable image-display medium and an image-forming device each using the same.

2. Description of the Related Art

As repeatedly rewritable image-display media, display techniques proposed hitherto include a twisting ball display (display utilizing rotation of particles having two separate colors), electrophoresis, magnetophoresis, thermally rewritable media, liquid crystals having memorizing ability, and the like. Such display techniques are excellent in image memorizing ability, but they have entailed problems insofar that the display has not been able to produce paper-like white color at its surface, and density contrast of images has been low.

In order to solve the above-mentioned problems, a display technique using a toner has been proposed. In this technique, a conductive colored toner and white particles are used to exhibit contrast, and thereby display images. In more detail, the conductive colored toner and the white particles are sealed in a void between electrode substrates facing each other, and electric charges are applied on the conductive colored toner through a charge transporting layer deposited on an inner surface of the non-display side of the electrode substrate, such that the charge-introduced conductive colored toner can migrate, via an electric field applied across the two electrode substrates, toward the display side of the electrode substrate, positioned opposite the non-display side of the electrode substrate, and thereby reach, and adhere to, the inside of the display side of the electrode substrate (see *Japan Hardcopy '99*, pp. 249-252).

This display technique, in which the image-display medium is made entirely of solid materials, is excellent insofar that displays of white-color and displays of black-color can in principle be completely interchanged. This technique, however, also entails drawbacks insofar that some of the conductive colored toner particles do not contact the charge transporting layer deposited on the inner surface of the non-display side of the electrode substrate, and that other conductive colored toner particles are produced which are isolated from the other conductive colored toner particles. But of these types of conductive colored toner particles cannot migrate, via the electric field, since no electric charges are applied on the toner particles. As a result, toner particles appeared at random between the two electrode substrates, causing a problem of diminished contrast density.

As an image-display medium using particles and excellent in density contrast, an image-display medium has also been proposed which comprises a pair of substrates and uses plural kinds of particles that have mutually different colors and charging characteristics, and are sealed in a void between the pair of substrates to allow migration between the substrates via an applied electric field (see Japanese Patent Application Laid-Open (JP-A) No. 2001-312225). This proposed technique has produced high-grade whiteness and high density contrast. The particles used in this image-display medium have been able to produce, at an initial stage, excellent white density, black density and density contrast. However, when images have repeatedly been rewritten over a long term, image density has been reduced, thereby leading to a decrease in density contrast, or to a lack of image uniformity, and thus on occasions causing image unevenness.

Image density is controlled by an electrical charge amount of the particles. Attempts have been made to adjust the electrical charge amount of the particles using a charge controlling agent that is conventionally used for an electrophotographic toner (see, e.g., JP-A No. 2002-10771). Use of the conventionally used charge controlling agent provided improvement in the electrical charge amount of the particles. However, it is still unsatisfactory to obtain desired density contrast by adjusting the electrical charge amount.

SUMMARY OF THE INVENTION

The present invention has been made in view of the above circumstances and provides display device particles that are capable of enhancing contrast of displayed images and suppressing deterioration of density contrast even when images are repeatedly displayed over a very long term, a process for producing the display device particles, as well as an image-display medium and an image-forming device each using the display device particles.

According to a first aspect of the invention, a display device particle is provided having positive or negative chargeability and having color, the display device particle is produced using at least a calcium compound, wherein a concentration of the calcium compound in the display device particle is 0.05% by weight or less in terms of a calcium element content.

According to a second aspect of the invention, a process is provided for producing a display device particle having positive or negative chargeability and having color, a process which comprises: at least an emulsification step in which at least an emulsifying auxiliary containing a calcium compound is used for forming the particle; and, at any point in time after the emulsification step, a removal step in which the calcium compound remaining in the display device particle is removed using an acidic solution having a pH of 2 or lower, wherein a concentration of the calcium compound in the display device particle after all of the steps have been carried out is 0.05% by weight or less in terms of a calcium element content.

According to a third aspect of the invention, an image-display medium is provided which comprises: a pair of substrates arranged to face each other; and particle groups made up of two or more kinds of particles and sealed in a void between the pair of substrates, in which at least one of the particle groups has positive chargeability, at least one of the other particle groups has negative chargeability, and the at least one of the former particle groups and the at least one of the latter particle groups have mutually different colors, wherein the particles having positive or negative chargeability are produced using at least a calcium compound, and a concentration of the calcium compound in the display device particles in terms of a calcium element content is 0.05% by weight or less.

According to a fourth aspect of the invention, an image-forming device is provided for forming an image in an image-display medium which comprises: a pair of substrates arranged to face each other; particle groups made up of two or more kinds of particles and sealed in a void between the pair of substrates, in which at least one of the particle groups has positive chargeability, and at least one of the other particle groups has negative chargeability; and an electric field generating unit for generating, in the void between the pair of substrates, an electric field corresponding to the image, wherein the particles having positive or negative chargeability (i) are produced using at least a calcium compound, (ii) have a concentration of the calcium compound of 0.05% by weight or less in terms of a calcium element content, and (iii) differ in color from each other.

DETAILED DESCRIPTION OF THE INVENTION

Figure 1:
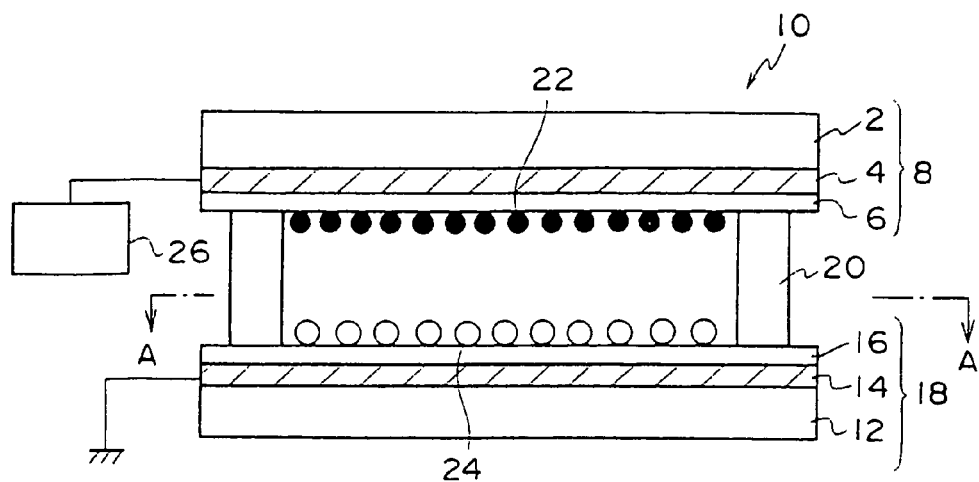
FIG. 1 is a schematic structural view illustrating an embodiment of an image-forming device using an image-display medium of the present invention.

The present invention will be described in more detail hereinafter.

First, description is given of the structures and effects each of an image-display medium and an image-forming device of the present invention.

Image-Display Medium and Image-Forming Device

The image-display medium is a medium comprising a pair of substrates arranged to face each other, and particle groups made up of two or more kinds of particles and sealed in a void between the pair of substrates, in which at least one of the particle groups has positive chargeability, at least one of the other particle groups has negative chargeability, and the at least one of the former particle groups and the at least one of the latter particle groups have mutually different colors. In the image-display medium, a display device particle of the present invention, to be described later, is used as the particle having positive or negative chargeability.

Sealing of the particles into this image-display medium is performed through the following processes. First, the two or more kinds of particles, which are sealed into the void between the pair of substrates arranged to face each other, are mixed at a prescribed ratio in a mixing container, and then stirred. It is considered that in this mechanical mixing and stirring step, frictional electrification is caused between the respective particles and between the particles and the inner wall of the container, whereby the respective particles are electrically charged. Thereafter, the mixed particles are sealed into the void between the pair of substrates so as to give a specific volume filling ratio.

Image formation in this image-display medium can be attained by use of an image-forming device comprising, between the pair of substrates to constitute the image-display medium, an electric field generating unit for generating an electric field corresponding to the image.

First, by using the electric field generating unit, polarity of a DC voltage applied between the pair of substrates is switched over or an alternative voltage is applied, such that the sealed particles reciprocate between the substrates in accordance with the electric field (an initializing step). It is considered that in this initializing step, the respective particles collide with each other or the particles collide against the substrate surface, to thereby confer frictional electricity on the particles. (As used herein, a term "substrate surface" refers to a surface of a substrate to face the other substrate, which is oppositely arranged, unless otherwise specified.). Through this initializing step, the particles acquire desired frictional electrification quantities.

By the above-mentioned frictional electrification, at least one kind of the plural kinds of particles is positively charged (the positively-charged particles may be referred to as "the first particles" hereinafter). At least one kind of the other is negatively charged (the negatively-charged particles may be referred to as "the second particles" hereinafter). At this time, by Coulomb force effected between the first particles and the second particles, the particles will adhere to each other and agglomerate. However, the first particles are separated from the second particles in a direction of the electric field applied finally in the initializing step. As a result, the first particles adhere to one of the two substrates, while the second particles adhere to the other.

Next, an electric field is applied to the medium in accordance with image signals, whereby the group of the first particles and that of the second particles are separated from each other, migrate and then adhere to the mutually different substrates. In more detail, when the electrostatic force acting on the individually electrified particles becomes larger than Coulomb force between the respective particles, than a force effected between the particles and the substrate surfaces, or than a force based on the contact potential difference therebetween by the electric field applied from the outside, it is considered that the first and second particle groups are separated from each other, migrate and then adhere to the opposite substrates. It is also considered that the particles adhered to the respective substrate surfaces are fixed thereto by mirror image force or van der Waals force generated between the particles and the substrate surfaces.

If the amount of electrostatic charge of respective particles is too low, charges are not sufficiently accumulated in the particles, whereby the particles have difficulty in moving in accordance with the electric field, thus failing to provide a sufficient contrast. Such a phenomenon is facilitated when image-display is repetitively carried out.

However, since the image-display medium of the invention uses the display device particles of the invention, to be described below, a sufficient contrast can be achieved. Also, when the medium of the invention is used, a reduced contrast can be suppressed even if image-display is repetitively performed over a very long period of time.

The above description is based on a prerequisite that each of the positively-charged particle groups and the negatively-charged particle groups is made up of particles of one kind. However, each of the two groups may be made up of particles of two or more kinds. Even in case where two or more kinds are used, images can be formed by the same mechanism as described above.

Structure of Substrates

The substrates used in the image-display medium are a pair of substrates arranged to face each other. The above-mentioned particles are sealed into the void between the pair of substrates. The substrates used in the image-display medium are in the shape of a plate having electric conductivity (conductive substrates). In order to impart a function serving as an image-display medium to the substrates, it is necessary that at least one of the pair of substrates is a transparent conductive substrate. In this case, the transparent conductive substrate acts as a display substrate.

For use as the conductive substrate in the image-display medium, the substrates themselves may have electric conductivity, or alternatively, the surface of an insulating support may undergo electrically conducting treatment. The conductive substrate may be either crystalline or amorphous. The substrates having electric conductivity by themselves may be made of a metal such as aluminum, stainless steel, nickel or chromium, or an alloy crystal thereof; or a semiconductor made of Si, GaAs, GaP, GaN, SiC, ZnO and the like.

The insulating support may comprise a polymer film, or a glass, quartz or ceramic plate. The insulating support may be subjected to electrically conducting treatment by film-forming of the above-listed metals or gold, silver, copper or the like through vapor deposition, sputtering, ion plating or some other method.

As the transparent conductive substrate, there may be used: a conductive substrate in which a transparent electrode is formed on one surface of an insulating transparent support; or a transparent support which has electric conductivity in itself. The transparent support which has electric conductivity in itself may be made of a transparent conductive material such as ITO(indium tin oxide), zinc oxide, tin oxide, lead oxide, indium oxide or copper iodide.

The insulating transparent support to be used may be a film or a plate-shaped material made of a transparent inorganic materials such as glass, quartz, sapphire, MgO, LiF or $CaF_2$, or a transparent organic resin such as fluorine-type resin, polyester, polycarbonate, polyethylene, polyethylene terephthalate, or epoxy resin; an optical fiber; a selfoc optical plate; or the like.

As the transparent electrode formed on one face of the above-mentioned transparent support, the following may be used: a film made from a transparent conductive material such as ITO (indium tin oxide), zinc oxide, tin oxide, lead oxide, indium oxide or copper iodide by employing vapor deposition, ion plating, sputtering or some other method; or a thin film sufficient to exhibit translucency and made from a metal such as Al, Ni or Au through vapor deposition or sputtering.

Another surface of the above-mentioned substrate that is arranged opposite to the other substrate is preferably provided with a protective layer exhibiting appropriate surface conditions owing to its effect on the charge polarity of the particles. The material of the protective layer may be selected mainly from the viewpoints of adhesiveness to the substrate, transparency, tribo series, and stain-proofing properties. Specific examples of the protective layer material include polycarbonate resin, vinyl silicone resin, and fluorine-group containing resin. The usable resins are selected considering a structure of the main monomer to constitute the particles used, and a reduced difference in frictional electrification between the resin and the particles.

Embodiments of Image-Forming Device

By reference to the accompanying drawings, an illustrative example of an image-forming device produced using the above-mentioned image-display medium will be described in detail hereinafter.

Figure 2:
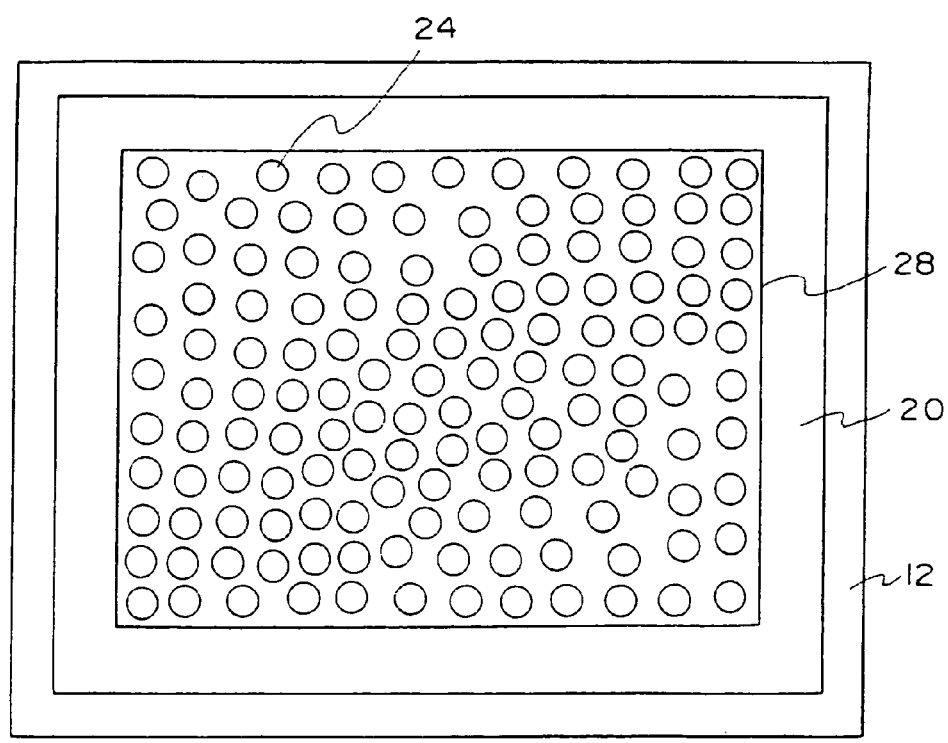
FIG. 2 is a sectional view of the image-forming device illustrated in FIG. 1, taken along a section line A-A.

FIG. 1 is a schematic structural view of the image-forming device, and FIG. 2 is a sectional view of FIG. 1, taken along a section line A-A. The image-forming device illustrated in FIG. 1 comprises an image-display medium 10 and a voltage generating unit 26. The image-display medium 10 is composed of a display substrate 8, blue particles 22, white particles 24, a non-display substrate 18, and a spacer 20. The display substrate 8 comprises a transparent electrode 4 and a protective layer 6, successively laminated on a surface of a transparent support 2. Similarly, the non-display substrate 18 comprises an electrode 14 and a protective layer 16, successively laminated on a surface of a support 12. The transparent electrode 4 of the display substrate 8 is connected to the voltage generating unit 26, and the electrode 14 of the non-display substrate 18 is grounded.

In the image-display medium of the invention, the display device particles of the invention, which will be described later, are used as the blue particles 22 and the white particles 24.

Description will now be given of the image-display medium 10, by illustrating specific dimensions and constituting materials thereof. However, the structure of the image-display medium 10 is not limited to the following specific structure.

As the transparent support 2, the transparent electrode 4, the support 12 and the electrode 14, which constitute the outside of the image-display medium 10, for example, glass substrates (#7059) with a transparent electrode ITO (indium tin oxide) having a size of 50 mm×50 mm×1.1 mm are used. The support 12 and the electrode 14 on the side of the non-display substrate 18 may not be necessarily transparent. The protective layers 6 and 16, which are made of a polycarbonate resin (PC-Z) and each have a thickness of 5 μm, are formed on the inner surfaces of the glass substrates (i.e., the respective surfaces of the transparent electrode 4 and the electrode 14) and contact with the particles.

The spacer 20 is a member molded by making a square space 28 having a size of 15 mm×15 mm at the center of a silicone rubber plate with a size of 40 mm×40 mm×0.3 mm, such that an empty space can be produced when the member is set up. Arrangement of this silicone rubber plate, in which the square space 28 is provided, on the surface of the non-display substrate 18 on which the electrode 14 and the protective layer 16 are formed produces the spacer 20.

Mixed particles of the blue particles 22 and the white particles 24 in an amount of about 15 mg are sieved through a screen into the empty space formed by the square space 28 produced in the spacer 20. Thereafter, the display substrate 8 is adhered closely to the spacer 20 to render the surface on which the transparent electrode 4 and the protective layer 6 are formed to face the non-display substrate 18. The two substrates 8 and 18 are held under pressure with double clips such that the spacer 20 are closely adhered to the two substrates 8 and 18, thereby forming the image-display medium 10.

Using the image-display medium 10, images are formed, for example, as follows. When a DC voltage of 150 V is first applied to the transparent electrode 4 of the display substrate 2 of the image-display medium 10 from the voltage generating unit 26, a part of the negatively-charged white particles 24 present on the side of the non-display substrate 18 begins to migrate to the display substrate 8 by the effect of an electric field generated. When a DC voltage of 500 V is applied thereto, many of the white particles 24 migrate to the side of the display electrode 8, and hence display density is substantially saturated. At this time, the positively-charged blue particles 22 migrate to the side of the non-display substrate 18. Thereafter, even if the voltage applied from the voltage generating unit 26 is set into 0 V, the white particles 24 adhering to the display substrate 8 do not move, thereby not changing display density.

Illustrated above is the image-forming device using the image-display medium with reference to the drawings. However, the invention is not limited thereto. For example, as the color of the particles, white and blue are exemplified. However, combinations of various colors may further be adopted.

As described above, one of the colors is preferably white. The sizes of respective members are illustrated as an example, and may be selected from various sizes depending on the use purpose of each of the members.

The image-forming device of the invention comprises one image-forming device having plural image-display media in which plural cells, each of which is made of a cell composed of the above-mentioned image-display medium, are arranged in a planar shape (or the cells are individually arranged in a planar shape in the void between the substrates to face each other). By arbitrarily selecting the number of cells in both a longitudinal direction and a lateral direction, it is possible to produce an image-forming device with a large screen having a desired resolution power.

Display Device Particle and Process for Producing the Same

A description will now be given of the display device particles used for the image-display medium and the image-forming device, as described above, and the process for producing such particles.

The display device particle of the invention having positive or negative chargeability and having color is produced using at least a calcium compound, and is characterized in that a concentration of the calcium compound in the display device particle is 0.05% by weight or less in terms of a calcium element content.

The concentration of the calcium compound in the display device particle is necessarily 0.05% by weight or less in terms of a calcium element content, preferably 0.04% by weight or less, and more preferably as close to 0% by weight as possible. As used herein, a concentration refers to the concentration thereof present in a final product of the display device particle after all of the producing steps have been completed.

If the concentration of the calcium compound in the display device particle is more than 0.05% by weight in terms of a calcium element content, the amount of electrostatic charge on the display device particle becomes smaller, and hence, electric charges needed for moving the display device particles via an electric field cannot accumulate on the display device particles, thus leading to a low contrast. Further, if image-display is repetitively carried out over a very long period of time, deterioration of contrast is augmented with time.

Incidentally, conventional display device particles produced using at least a calcium compound and having color and positive or negative chargeability contain the calcium compound at a concentration of more than 0.05% by weight in terms of a calcium element content. Owing to this concentration, the conventionally used particles have a small amount of electrostatic charges and hence occasionally provide a low contrast. Although the conventionally used particles can maintain a good contrast for some period of time even if repetitive image-display is performed, deterioration of contrast with time cannot be suppressed in case where image-display is repetitively performed over a very long term that is at least several times longer than the conventionally employed period.

It is necessary that at least one of the two or more kinds of particles used in the image-display medium is controlled to have positive chargeability, while at least one of the other is controlled to have negative chargeability. When different two kinds of particles collide with each other or are subjected to rubbing with each other to have triboelectricity, the one is positively charged and the other is negatively charged depending on a positional relationship between the two kinds of particles with respect to tribo series. In order to regulate this tribo series appropriately, it is preferable to adjust a content of calcium carbonate in the display device particle exhibiting positive or negative chargeability.

The display device particles of the invention applicable to the above image-display medium are produced using at least a calcium compound. Any calcium compound may be used, insofar as it is applicable to the production of the display device particles. An appropriate calcium compound can be chosen depending on the use form (depending on whether it should be directly used as a raw material or whether it should be indirectly or supplementarily used as an emulsifying auxiliary or the like) as described below.

As used herein, the term "produced using at least a calcium compound" refers to a case where the calcium compound is included in the raw material for the production of the display device particles and/or a case where the calcium compound is supplementarily or indirectly used as a material other than the raw material for the production of the display device particles (for example, as a catalyst, a reaction aid or the like for facilitating chemical reaction involved in producing the display device particles).

In the former case, for example, a white pigment such as calcium carbonate, calcium sulfate and calcium phosphate may be used as a raw material for controlling color hue upon production of display device particles of a non-white color, such as red and green.

In the latter case, and if the display device particles of the invention are produced through at least an emulsification step, in which a calcium compound that is substantially insoluble in water may be used as an emulsifying auxiliary.

The calcium compound hardly soluble in water may be calcium carbonate, calcium phosphate or the mixture thereof. Preferably, calcium carbonate is used. Any other emulsifying auxiliary may be used, such as any known anionic, nonionic or cationic surfactant and any macromolecular dispersant such as polyvinyl alcohol, polyvinyl pyrolidone, gelatin, methyl cellulose, poly(acrylic acid), starch, and casein.

As described above, the display device particles of the invention are produced necessarily using the calcium compound. Accordingly, in some cases, the concentration of the calcium compound in the particle may exceed 0.05% by weight in terms of a calcium element content, in the middle course of an entire producing process of the display device particles (hereinafter, sometimes referred to as "immature particles").

In such a case, use amount of the calcium compound is reduced in the production of the display device particles, or alternatively, the immature particles containing the calcium compound in an excessively large amount are subjected to washing using an acidic solution such that an excess of the calcium compound can be removed.

The acidic solution for removing the calcium compound, employed in the latter case, preferably has a pH of 2 or lower, and more preferably a pH of 1 or lower. If an acidic solution having a pH of higher than 2 is used, the calcium compound may insufficiently be removed using such an acidic solution, and then another acidic treatment requiring a very long time may be needed, thus probing impractical. As used herein, a pH of the acidic solution for removing the calcium compound refers to a pH of a slurry of particles containing the calcium compound to which has already been added an acid. Any type of acid may be used without limitation, and examples of such an acid include known acids such as hydrochloric acid, sulfuric acid, nitric acid, and acetic acid.

In case where the calcium compound originates from the raw materials used for production of the display device particles, the removal step of removing the calcium compound may be carried out, as needed, at any time during the producing process of the display device particles. In case where the calcium compound is supplementarily or indirectly used as a material other than the raw material in production of the display device particles, that is, calcium carbonate is used as the emulsifying auxiliary, the removal step may be carried out, as needed, at any time after the step in which the calcium compound is used supplementarily or indirectly.

In case where the display device particles are produced through at least an emulsification step, for example, the acid may be added to the particle-containing emulsion (the particle slurry) obtained through the emulsification step, and then the resulting mixture (the acidic solution) may be stirred to thus conduct washing with acid. Alternatively, the particles may be separated from the emulsion by filtration by means of suction and dispersed in a separately prepared acidic solution and stirred to thus conduct washing with acid.

The display device particle of the invention is desirably in the shape of almost sphere. If the display device particle has an almost spherical shape, the contact between the display device particles or between the display device particle and the substrate surface can be almost point contact so that the adhesive force based on Van der Waals force between the display device particles or between the display device particle and the substrate surface can be small. Thus, even if the substrate surface is a dielectric, the display device particles that are electrostatically charged via an electric field can smoothly move between the substrates. Further, the display device particles having such an almost spherical shape can effectively be prevented from deforming or sticking when they collide against the display surface.

The display device particle of the invention is preferably produced by any known wet process such as suspension polymerization, emulsion polymerization and dissolving/suspending method, which includes an emulsification step as performed in a method of producing an electrophotographic toner.

Any commercially available apparatus employed as an emulsifier or a disperser can be used in the emulsification step without any limitation. Examples of the apparatus include a batch-type emulsifier such as Ultra Turrax (manufactured by IKA Werke.), Polytron (manufactured by Kinematika Co., Ltd.), TK Auto Homomixer (manufactured by Tokushu Kika Kogyo Co., Ltd.), and National Cooking Mixer (manufactured by Matsushita Electric Industrial Co., Ltd.); a continuous-type emulsifier such as Ebara Milder (manufactured by Ebara Corporation), TK Pipeline Homomixer and TK Homomik Line Flow (manufactured by Tokushu Kika Kogyo Co., Ltd.), Colloid Mill (manufactured by Shinko Pantek Co., Ltd.), Slusher and Trigonal Wet Grinder (manufactured by Mitsui Miike Kakoki Co., Ltd.), Cavitron (manufactured by Eurotek Inc.), and Fine Flow Mill (manufactured by Taiheiyo Kiko Co., Ltd.); a batch and continuous emulsifier such as Cleamix (manufactured by M Technique Co., Ltd.) and Fillmix (manufactured by Tokushu Kika Kogyo Co., Ltd.); a high pressure emulsifier such as Microfluidizer (manufactured by Mizuho Kogyo Co., Ltd.), Nanomaker and Nanomizer (manufactured by Nanomizer Inc.), and APV Goulin (manufactured by Goulin Inc.); a membrane emulsifier such as Membrane Emulsifier (Reika Kogyo Co., Ltd.); a vibration-type emulsifier such as Vibromixer (manufactured by Reika Kogyo Co., Ltd.); and an ultrasonic emulsifier such as Ultrasonic Homogenizer (manufactured by Branson Inc.).

In the above-described wet process, if necessary, a solvent may be used to dissolve a resin for forming the display device particles. The solvent is preferably a solvent that dissolves the resin and is immiscible with water. Examples of such a solvent include an ester solvent such as methyl acetate, ethyl acetate, propyl acetate, and butyl acetate; an ether solvent such as diethyl ether, dibutyl ether and dihexyl ether; a ketone solvent such as methyl ethyl ketone, methyl isopropyl ketone, methyl isobutyl ketone, and cyclohexanone; a hydrocarbon solvent such as toluene and xylene; and a halogenated hydrocarbon solvent such as dichloromethane, chloroform and trichloroethylene. Preferably, the solvent can dissolve the polymer and has a solubility in water of about 0 to about 30% by weight.

The particles prepared through the above-described wet process are generally subjected to a drying process. In the drying process, any known dryer may be used, such as a vacuum dryer, a paddle dryer, a vibration fluidized dryer, a tube dryer, a shelf dryer, and an airflow dryer such as a flush dryer. The airflow dryer such as the flush dryer is preferably used to dry the particles in a short time.

Next, a description is given in detail below of an exemplary method for producing the display device particles of the invention through the wet process. First, an oil phase composition and an aqueous phase composition, that is to be mixed with the oil phase composition, are respectively prepared. The oil phase composition is prepared by dissolving and/or dispersing, in a monomer or a solvent, components for producing display device particles, i.e., a resin, a colorant, and optionally used components such as a charge-controlling agent and a polymerization initiator.

Then, the oil phase composition and the aqueous phase composition are subjected to emulsification using the emulsifying machine as listed above to form particles having a desired particle diameter. In this step, the calcium compound such as calcium carbonate is used as an emulsifying auxiliary. In case where the oil phase composition contains the monomer, the oil droplets formed in the emulsion are allowed to cause a polymerization reaction to thereby form particles. If any solvent is used to dissolve the resin component, it should be removed from the emulsion.

After the emulsification step is completed, the resulting particles are washed and then dried. In the washing step for removing an excess of the calcium compound from the particles, to the emulsion containing the particles produced through the emulsification step is added an acidic solution to conduct washing the particles with the acid. An excess of the calcium compound can be removed from the particles by washing with acid, and as a result, the concentration of the calcium compound in the final product of the display device particles can be controlled to 0.05% by weight or less in terms of a calcium element content.

After washing with acid, the resultant particles are further washed with water to remove calcium ions generated through ionization caused by reaction with the acid, the surfactant, the polymer dispersant and the like used for producing the particles. After washing with water, the particles are finally subjected to the drying step as described above, whereby the display device particles of the invention can be obtained. If necessary, the particles may further be subjected to classification to control a particle size distribution.

Constituting Materials for Display Device Particle

The display device particles of the invention comprises at least a colorant and a resin. The display device particles may further comprise a charge controlling agent and other components, as necessary. The colorant may share a function serving as the charge controlling agent. The colorants used in the invention are exemplified below.

Examples of the black colorant include carbon black, titanium black, magnetic powder, oil black, and organic or inorganic black dyes or pigments.

Examples of the white colorant include rutile-type titanium oxide, anatase-type titanium oxide, zinc white, lead white, zinc sulfide, aluminum oxide, silicon oxide, and zirconium oxide. Among these, rutile-type titanium oxide is particularly preferable.

Examples of the colorant having other colors include phthalocyanine-type, quinacridon-type, azo-type, condensed-type, insoluble lake pigment, and inorganic oxide-type dye or pigments. Representative examples thereof include Aniline Blue, Calconyl Blue, chromium yellow, ultramarine blue, Du Pont Oil Red, Quinoline Yellow, methylene blue chloride, Phthalocyanine Blue, malachite green oxalate, lamp black, Rose Bengal, C.I. Pigment Red 48:1, C.I. Pigment Red 122, C.I. Pigment Red 57:1, C.I. Pigment Yellow 97, C.I. Pigment Yellow 180, C.I. Pigment Yellow 185, C.I. Pigment Blue 15:1, and C.I. Pigment Blue 15:3.

Examples of the structure of the colorant which may function as the charge controlling agent include a structure having an electron withdrawing group, a structure having an electron donating group, and a metal complex structure. Specific examples of the colorant include C.I. Pigment Violet 1, C.I. Pigment Violet 3, C.I. Pigment Black 1, and C.I. Violet 23.

Examples of the resin, which constitute the display device particles, include polyvinyl resins such as polyolefin, polystyrene, acrylic resin, polyacrylonitrile, polyvinyl acetate, polyvinyl alcohol, polyvinyl chloride, and polyvinyl butyral; vinyl chloride/vinyl acetate copolymer; styrene/acrylic acid copolymer; straight silicone resins having organosiloxane bonds, and modified products thereof; fluorine group-containing reins such as polytetrafluoroethylene, polyvinyl fluoride, and polyvinylidene fluoride; polyester; polyurethane; polycarbonate; amino resins; and epoxy resins. These resins may be used alone or in combination thereof. These resins may be crosslinked. A conventionally known binder resin, which is known as a main component of conventional electrophotographic toner, can be used in the display device particles without any problem.

If necessary, a charge controlling agent may be added to the display device particles in order to regulate charging characteristics. As the charge controlling agent, any known charge controlling agent employed in conventional electrophotographic toner can be used. Examples thereof include cetylpyridium chloride; BONTRON P-51, BONTRON P-53, BONTRON E-84, and BONTRON E-81 each of which is manufactured by Oriental Chemical Industries Ltd.); quaternary ammonium salts such as COPY CHARGE PSY VP2038 (manufactured by Clariant (Japan) K.K.); salicylic acid metal complexes; phenolic condensates; tetraphenolic compounds; metal oxide particles; and metal oxide particles having surface-treated with various coupling agents.

EXAMPLES

The present invention will now be described in more detail by way of the examples. In the following Examples and Comparative Examples, an image forming medium and an image-forming device shown in FIGS. 1 and 2 are used to confirm the effects of the invention by changing the structure of white particles and that of blue particles. In the examples, sizes, materials and other items of respective members are selected to have the same features as described specifically with reference to FIGS. 1 and 2.

<Production of Display Device Particles>

As display device particles, white particles and blue particles are separately produced in the following manner.

1) Production of White Particles D1 a) Preparation of Dispersion A
  Styrene monomer: 50 parts by weight
  Titanium oxide (TAIPAKE CR63, manufactured by Ishihara Sangyo Kaisha, Ltd.): 30 parts by weight
  Polymerization initiator AIBN (azoisobutyronitrile): 1 part by weight A mixture of the above-indicated composition is subjected to ball mill pulverization using zirconia balls of 10 mmφ diameter for 20 hours to thereby prepare a dispersion A.

b) Preparation of Calcium Carbonate Dispersion B
  Calcium carbonate: 30 parts by weight
  Water: 70 parts by weight A mixture of the above-indicated composition is subjected to ball mill pulverization to thereby give a calcium carbonate dispersion B.

c) Preparation of Emulsion C
  Calcium carbonate dispersion B: 18 parts by weight
  Aqueous 20% sodium chloride solution: 50 parts by weight A mixture of the above-indicated composition is stirred in an emulsifier (Ultra Turrax), to which is then added 30 parts by weight of dispersion A. The resulting mixture is emulsified at 20 m/s for 3 minutes in an emulsifier (Ultra Turrax) to obtain an emulsion C.

d) Washing, Drying and Classification

The obtained emulsion C is heated at 70° C. under a nitrogen gas flow and stirred for 20 hours to cause polymerization for producing particles. Then, 1.5 parts by weight of 35% hydrochloric acid and 10 parts by weight of ion exchange water are added to 10 parts by weight of the emulsion C (particle slurry) in which the particles are formed, and stirred for additional 1 hour to dissolve the calcium carbonate that is included in the particles. A pH of the acidic solution, which is the mixture of the emulsion C and hydrochloric acid, is measured by means of pH test paper and found to be 1 or lower.

After the stirring, the mixture is subjected to 5 cycles of filtration by means of suction and washing with water. The resulting particles are further subjected to filtration by means of suction and dried, and then classified to yield white particles D1. The concentration of the calcium compound in white particles D1 is 0.02% by weight in terms of a calcium element content.

Production of White Particles D2

In a similar manner to the preparation of white particles D1, an acidic solution is prepared by adding 1.3 parts by weight of 35% hydrochloric acid and 10 parts by weight of ion exchange water to 10 parts by weight of emulsion C (particle slurry) in which the particles are formed. The pH of the acidic solution is measured by means of pH test paper and found to be 1 or lower. White particles D2 are produced in the same manner as production of white particles D1, except that the acidic solution is stirred for 30 minutes. The concentration of the calcium compound in white particles D2 is 0.04% by weight in terms of a calcium element content.

Production of White Particles D3

An acidic solution is prepared by adding 1.15 parts by weight of 35% hydrochloric acid and 10 parts by weight of ion exchange water to 10 parts by weight of emulsion C (particle slurry), which contains the particles for forming white particles D1. The pH of the acid solution is measured by means of pH test paper and found to be 2.5.

The resulting mixture is then stirred for 15 minutes to dissolve the calcium carbonate that is included in the particles. Filtration by means of suction, washing with water, drying, and classification are performed similarly to the process of white particles D1, to thereby obtain white particles D3. The concentration of the calcium compound in white particles D3 is 0.07% by weight in terms of a calcium element content.

Production of Blue Particles

Styrene monomer: 90 parts by weight
Blue pigment (C.I. Pigment Blue 15:3, Sanyo Cyanine Blue Kro, Sanyo Color Works Ltd.): 10 parts by weight
Polymerization initiator AIBN (azoisobutyronitrile): 1 part by weight A mixture of the above-indicated composition is subjected to ball mill grinding with 10 mmφ zirconia balls for 20 hours to form a dispersion A'.

Blue particles (named blue particles E1) are produced in the same manner as production of white particles D1, except that dispersion A' is used in place of dispersion A. The acidic solution has a pH of 1 or lower, which is formed by adding hydrochloric acid to the emulsion (particle slurry) containing the particles for forming blue particles E1. The concentration of the calcium compound in blue particles E1 is 0.03% by weight in terms of a calcium element content.

The concentration of the calcium element originating from calcium carbonate that is included in the display device particles is determined by X-ray photoelectron spectroscopy (XPS). In the XPS, determination is performed using ESCAlab-220iXL and Mg—Kα (300 W) as an excitation source, in which a detection mode is set at Large-area (XL-ON).

Table 1 shows the results of the concentration of the calcium element originating from the calcium compound that is included in the produced display device particles.

TABLE 1

| | Conditions for Removing Calcium Compound | | | Concentration of Calcium Compound in Display Device Particles (in Terms of Calcium Element Content) |
|---|---|---|---|---|
| | pH of Acidic Solution | Type of Acid | Stirring Duration | |
| White Particles D1 | 1 or Lower | Hydrochloric Acid | 1 hour | 0.02 wt % |
| White Particles D2 | 1 or Lower | Hydrochloric Acid | 30 minutes | 0.04 wt % |
| White Particles D3 | 2.5 | Hydrochloric Acid | 15 minutes | 0.07 wt % |
| Blue Particles E1 | 1 or Lower | Hydrochloric Acid | 1 hour | 0.03 wt % |

<Preparation of Mixed Particles>

Each of the produced white particles of various kinds is blended with the blue particles E1, and then admixed to prepare mixed particles for use in Examples and Comparative Examples. At this time, a blending ratio (by weight) of the white particles relative to the blue particles is specified to be 2:1. The mixture is subjected to vibratory stirring by hand to provide electric charges, to thereby obtain mixed particles. In the Examples and Comparative Examples, the white particles are positively charged, while the blue particles are negatively charged.

<Production of Image-Display Medium>

Each of the mixed particles of various kinds as produced above is sealed into a void between the substrates arranged to face each other (i.e., a display substrate 8 and a non-display substrate 18), and then an image-forming device using the image-display medium 10 is produced in a usual manner. A voltage of 500 V is applied between a transparent electrode 4 and an electrode 14 of the resultant image-forming device, to function as a desired electric field onto the group of the particles that are present between the display substrate 8 and the non-display substrate 18, whereby the respective particles 22 and 24 migrate between the display substrate 8 and the non-display substrate 18. By switching over polarity of the applied voltage, the different kinds of the particles 22 and 24 move in mutually different directions between the display substrate 8 and the non-display substrate 18. By switching over voltage polarity repeatedly, the different kinds of particles reciprocate between the display substrate 8 and the non-display substrate 18. Through this process, the particles 22 and the particles 24 are further electrified to have different polarities by collision between the particles 22, between the particles 24, and between the particles 22 or 24 and the display substrate 8 or the non-display substrate 18.

In the image-forming device as produced above, the white particles are positively charged and the blue particles are negatively charged, whereby the two kinds of particles move to directions different from each other depending on the electric field generated between the display substrate 8 and the non-display substrate 18. When the direction of the electric field is fixed on either one of the two directions, each of the two kinds of particles 22 and 24 adheres to the display substrate 8 or the non-display substrate 18, to thus form an image.

<Evaluating Test>

In the image-forming device using the above-produced mixed respective kinds of particles, polarity of the voltage is switched over every one second to render the two kinds of particles 22 and 24 to move to different directions between the display substrate 8 and the non-display substrate 18 every one second. This switchover is repeated 1,000 cycles to make the image-display device set on an initial state. In this case, a difference between image density generated when the white particles migrate to the display screen side, and image density generated when the blue particles migrate thereto is defined as contrast. The resultant image is measured for density using a Macbeth densitometer. When a density difference is 0.7 or more, it is rated to have a sufficient contrast.

Then, polarity of the voltage is switched over every 0.1 second, and this switchover is repeated 500,000 cycles to display an image. The obtained image is evaluated for density contrast in a similar manner as performed in the initial state. The results are shown in Table 2.

TABLE 2

| | White Particles Used | Blue Particles Used | Initial Image Quality Contrast | Image Quality After Repetitive Display Contrast | Remarks | Total Assessment |
|---|---|---|---|---|---|---|
| Example 1 | D1 | E1 | 0.74 | 0.72 | Good | Good |
| Example 2 | D2 | E1 | 0.73 | 0.72 | Good | Good |

TABLE 2-continued

| | White Particles Used | Blue Particles Used | Initial Image Quality Contrast | Image Quality After Repetitive Display Contrast | Remarks | Total Assessment |
|---|---|---|---|---|---|---|
| Comparative Example 1 | D3 | E1 | 0.65 | 0.35 | The electrostatic charge amount of the particles is low and thereby movement thereof is insufficient from an initial stage, and such a phenomenon is noticeable particularly after repetitive display. | Bad |

As detailed above, the present invention provides display device particles that are capable of enhancing contrast of displayed images and suppressing deterioration of density contrast even when images are repeatedly displayed over a long term, a process for producing the display device particles, as well as an image-display medium and an image-forming device each using the display device particles.

What is claimed is:

1. A display device particle having positive or negative chargeability and having color, the particle being produced using at least a calcium compound, wherein a concentration of the calcium compound in the display device particle is 0.05% by weight or less in terms of a calcium element content, wherein the display device particle is produced by a process comprising at least an emulsification step in which at least an emulsifying auxiliary including the calcium compound is used for forming the particle, and a removal step in which the calcium compound is removed from the particle using an acidic solution having a pH of 2 or lower.

2. The display device particle according to claim 1, wherein the concentration of the calcium compound is 0.04% by weight or less in terms of a calcium element content.

3. The display device particle according to claim 1, comprising a black colorant selected from the group consisting of carbon black, titanium black, magnetic powder, and oil black.

4. The display device particle according to claim 1, comprising a white colorant selected from the group consisting of rutile-type titanium oxide, anatase-type titanium oxide, zinc oxide, white lead, zinc sulfide, aluminum oxide, silicon oxide, and zirconium oxide.

5. The display device particle according to claim 1, comprising a chromatic colorant selected from the group consisting of a phthalocyanine-type colorant, a quinacridone-type colorant, an azo-type colorant, a condensate-type colorant, an insoluble lake pigment, and an inorganic oxide-type colorant.

6. The display device particle according to claim 1, further comprising a charge controlling agent.

7. The display device particle according to claim 1, wherein the calcium compound comprises calcium carbonate.

8. An image-display medium comprising:
a pair of substrates arranged to face each other; and
particle groups made up of two or more kinds of particles and sealed in a void between the pair of substrates, in which at least one of the particle groups has positive chargeability, at least one of the other particle groups has negative chargeability, and the at least one of the former particle groups and the at least one of the latter particle groups have mutually different colors,
wherein the particles having positive or negative chargeability are produced using at least a calcium compound, and a concentration of the calcium compound in the display device particles in terms of a calcium element content is 0.05% by weight or less.

9. The image-display medium according to claim 8, wherein the substrates are electrically conductive substrates selected from the group consisting of aluminum, stainless steel, nickel, chromium, and any crystalline alloy thereof.

10. The image-display medium according to claim 8, wherein the substrates comprise a semiconductor selected from the group consisting of Si, GaAs, GaP, GaN, SiC, and ZnO.

11. The image-display medium according to claim 8, wherein the substrates comprise an electrically-conductive transparent material selected from the group consisting of ITO, zinc oxide, tin oxide, lead oxide, indium oxide, and copper iodide.

12. An image-forming device for forming an image in an image-display medium, the device comprising:
a pair of substrates arranged to face each other;
particle groups made up of two or more kinds of particles and sealed in a void between the pair of substrates, in which at least one of the particle groups has positive chargeability, and at least one of the other particle groups has negative chargeability; and
an electric field generating unit for generating, in the void between the pair of substrates, an electric field corresponding to the image,
wherein the particles having positive or negative chargeability (i) are produced using at least a calcium compound, (ii) have a concentration of the calcium compound of 0.05% by weight or less in terms of a calcium element content, (iii) differ in color from each other, and (iv) reciprocate between the substrates in accordance with the electric field.

13. The image-forming device according to claim 12, wherein the substrates are electrically-conductive substrates selected from the group consisting of aluminum, stainless steel, nickel, chromium, and any crystalline alloy thereof.

14. The image-forming device according to claim 12, wherein the substrates comprise a semiconductor selected from the group consisting of Si, GaAs, GaP, GaN, SiC, and ZnO.

15. The image-forming device according to claim 12, wherein the substrates comprise an electrically-conductive transparent material selected from the group consisting of ITO, zinc oxide, tin oxide, lead oxide, indium oxide, and copper iodide.

* * * * *